United States Patent [19]

Bacsksai

[11] 4,098,774
[45] Jul. 4, 1978

[54] QUATERNARY AMMONIUM CATALYST SYSTEM FOR THE POLYMERIZATION OF 2-PYRROLIDONE

[75] Inventor: Robert Bacsksai, Kensington, Calif.

[73] Assignee: Chevron Research Company, San Francisco, Calif.

[21] Appl. No.: 687,968

[22] Filed: May 19, 1976

[51] Int. Cl.$^2$ ............................................. C08G 69/24
[52] U.S. Cl. ................... 260/78 P; 252/428; 252/431 N; 528/314; 528/323; 260/326.5 FL; 260/326.5 FN
[58] Field of Search ............................ 260/78 P, 78 L

[56] References Cited

U.S. PATENT DOCUMENTS

| 2,638,463 | 5/1953 | Ney et al. | 260/78 P |
|---|---|---|---|
| 3,346,566 | 10/1967 | Chiddix et al. | 260/239.3 R |
| 3,681,294 | 8/1972 | Jarovitzky | 260/78 P |
| 3,681,295 | 8/1972 | Jarovitzky | 260/78 P |
| 3,721,652 | 3/1973 | Barnes | 260/78 P |
| 3,835,100 | 9/1974 | Sekiguchi et al. | 260/78 P |

FOREIGN PATENT DOCUMENTS 82,403  7/1972  Japan.

*Primary Examiner*—Harold D. Anderson
*Attorney, Agent, or Firm*—Dix A. Newell; T. G. DeJonghe

[57] ABSTRACT

The process of making a catalyst for the polymerization of 2-pyrrolidone by contacting an alkali metal pyrrolidonate, a quaternary ammonium halide and carbon dioxide in a mol ratio of about 1:0.1–2:0.1–0.5. The alkali metal pyrrolidonate may be prepared by reacting an alkali metal hydroxide with 2-pyrrolidone. The polymerization of 2-pyrrolidone in the presence of this catalyst system produces poly-2-pyrrolidone of high molecular weight.

9 Claims, No Drawings

QUATERNARY AMMONIUM CATALYST SYSTEM FOR THE POLYMERIZATION OF 2-PYRROLIDONE

BACKGROUND OF THE INVENTION

Poly-2-pyrrolidone is produced by the alkaline-catalyzed polymerization of 2-pyrrolidone. The catalyst system may comprise a partially carbonated pyrrolidonate salt made, for example, by reacting an alkali metal hydroxide with 2-pyrrolidone, or by reacting a quaternary ammonium hydroxide with 2-pyrrolidone, dehydrating, and contacting the product with carbon dioxide (U.S. Pat. No. 3,721,652). Japanese Pat. No. 47-26195 discloses a process for making a catalyst by reacting a non-water-forming alkali metal compound with 2-pyrrolidone and contacting the product with a quaternary ammonium halide under anhydrous conditions. In U.S. Pat. No. 3,835,100, the catalyst obtained by reacting an alkali metal alkoxide with a quaternary ammonium halide and contacting the product, ammonium alkoxide, with 2-pyrrolidone, also avoids the production of water. While both of the latter processes are anhydrous, they do not produce poly-2-pyrrolidone and very high molecular weight in ordinary reaction times. For many purposes, it is advantageous to be able to rapidly produce poly-2-pyrrolidone having high molecular weight, e.g. in excess of 500,000, in good yield.

BRIEF SUMMARY OF THE INVENTION

A catalyst capable of producing a high-molecular-weight poly-2-pyrrolidone is made by contacting an alkali metal pyrrolidonate, certain quaternary ammonium halides and carbon dioxide in the mol ratio of 1:0.1–2:0.1–0.5.

DESCRIPTION OF PREFERRED EMBODIMENTS

While poly-2-pyrrolidone of 300,000 weight average molecular weight is producible over a polymerization period of less than 24 hours by using a partially carbonated potassium pyrrolidonate catalyst, the catalyst of the present invention is capable of producing poly-2-pyrrolidone having a weight average molecular weight in excess of 1,000,000 under the same conditions. The present catalyst also achieves high yields and high conversion rates without diminution of molecular weight. The catalyst does not require an anhydrous source of alkali metal pyrrolidonate. The pyrrolidonate may be made by contacting 2-pyrrolidone with the hydroxide, rather than by contacting it with an alkali metal or alkali metal alkoxide.

CATALYST SYSTEM

In the process of the present invention a catalyst for the polymerization of 2-pyrrolidone is made by contacting an alkali metal pyrrolidonate, certain quaternary ammonium halides and carbon dioxide in mol ratio of about 1:0.1–2:0.1–0.5, preferably in mol ratio of about 1:0.2–1.5:0.1–0.5, and most preferably in a mol ratio of about 1:1:0.3.

The reactants, i.e., the pyrrolidonate, the halide and carbon dioxide, may be contacted in any order beginning with the pyrrolidonate as one of the components. It is preferred, but not necessary, to add the quaternary ammonium halide to the previously carbonated pyrrolidonate salt. In a preferred embodiment, the catalyst of the present invention is formed in a solution of 2-pyrrolidone. An alkali metal hydroxide is added to an excess of 2-pyrrolidone, with which it reacts to produce a solution of the alkali metal pyrrolidonate and water in 2-pyrrolidone. The solution is dehydrated until it contains less than about 0.1–0.2 weight percent water. Then carbon dioxide is added in the required mol ratio to the pyrrolidonate in the solution at a temperature of about 25°–30° C. The quaternary ammonium halide is also added in the required mol ratio to the pyrrolidonate at about the same temperature.

Another method for preparing the catalyst systems of this invention involves the in situ preparation of tetraalkyl ammonium halide by the reaction of trialkylamine with an alkyl halide. A portion of the 2-pyrrolidone monomer may be used as a solvent in which this reaction is carried out. This method involves dissolving the trialkylamine in 2-pyrrolidone and then adding the alkyl halide while at the same time maintaining the temperature within the range of about 10° to 50° C. When the reaction is completed, the resulting solution is reacted with alkali metal pyrrolidonate and carbon dioxide as by addition to a pyrrolidone solution in which the carboxylated alkali metal salt has been prepared by the usual procedures.

The quaternary ammonium halide of this invention is a lower alkyl, alkylaryl or aralkyl ammonium halide. The quaternary ammonium halide is preferably a tetraalkyl ammonium halide. The tetraalkyl ammonium halide is preferably a tetra ($C_1$–$C_6$) alkyl ammonium halide, and most preferably a tetra ($C_1$–$C_3$) alkyl ammonium halide. Representative alkyl groups include methyl, ethyl, propyl, isopropyl, butyl, isobutyl, t-butyl, hexyl, etc. The ammonium halide is preferably a chloride, bromide or iodide or more preferably a chloride or bromide, most preferably a chloride. The ammonium halide may be used as a combination of species, e.g., as a mixture of tetramethyl ammonium chloride and tetraethyl ammonium bromide. The ammonium halide should be substantially soluble under the alkaline conditions of catalyst system preparation in order to show an appreciable effect on the polymerization reaction.

Alkylaryl ammonium halides, such as phenyl trimethyl ammonium halide and tolyl triethyl ammonium halide, are included within the scope of the ammonium halides of this invention. The ammonium halides finding use within the scope of this invention also include compounds such as $R^1R^2R^3$ ($\phi CH_2$) NX wherein $\phi$ represents a phenyl and $R^1$, $R^2$ and $R^3$ may be the same or different lower alkyl groups or other lower aralkyl groups, and X is a halide. Consequently, quaternary ammonium halide, as used herein encompasses the aralkyl ammonium halides. These aralkyl groups will normally contain 7–12 carbon atoms e.g. benzyl, phenethyl etc.

The alkali metal pyrrolidonate is preferably sodium or potassium pyrrolidonate. For certain purposes, it may be advantageous to substitute for pyrrolidonate in whole or in part an alkali metal caprolactamate or the alkali metal salt of another low-molecular-weight lactam, but this is normally not preferred to the use of the pyrrolidonate. The alkali metal pyrrolidonate is preferably made by contacting the alkali metal hydroxide with excess 2-pyrrolidone, but other methods may be chosen, such as by reacting 2-pyrrolidone with an alkali metal or an alkali metal alkoxide. In contrast to the production of quaternary ammonium pyrrolidonate from quaternary ammonium hydroxide, the process of the present invention does not yield as intense an amine odor. In fact, the process utilizing sodium pyrrolidonate (e.g. NaOH derived) and quaternary ammonium halide, is substantially odorless and sodium is preferred for this reason. While it is preferable to contact the tetraalkyl ammonium halide, the pyrrolidonate and carbon dioxide in a 2-pyrrolidone solution, inert solvents may be used in whole or in part to replace the 2-pyrrolidone. Sulfur dioxide is believed to be a partial substitute for carbon dioxide, and its use is not barred in the practice of the present invention.

In the catalyst system of the present invention, polymerization initiators and polymerization accelerators may also be used. Unexpectedly rapid polymerization to poly-2-pyrrolidone of satisfactorily high molecular weight is achieved in this catalyst system by the addition of 0.05–1.5 mol percent of acetic anhydride. Preferably 0.05–1.0 and most preferably about 0.05–0.5 mol percent of acetic anhydride is used. Suitable accelerators are also described in U.S. Pat. No. 3,721,652 and include N-acyl lactam, particularly the N-acyl pyrrolidones, preferably N-acetyl pyrrolidone. 1-(1-pyrrolin-2-yl)-2-pyrrolidone is a particularly preferred activator.

POLYMERIZATION CONDITIONS

The polymerization process of this invention is specifically applicable to the polymerization of 2-pyrrolidone to form a polymeric carbonamide of very high molecular weight in a reasonably short polymerization time, for this reaction, of 4–24 hours. Weight average molecular weights in excess of 1,000,000 have been attained. The high-molecular-weight polymer is capable of being formed into filaments having substantial orientation along the filamentary axis, high tensile strength and other properties suitable for making into textiles. It can be made into shaped articles and film by melt-molding or extrusion.

In order to produce high-quality poly-2-pyrrolidone capable of being formed into fibers, filaments and yarn of commercial textile quality, it is necessary that the 2-pyrrolidone be of high purity. Depending upon the process of manufacture, commercially available 2-pyrrolidone may contain appreciable amounts of various impurities, some of which are believed to interfere deleteriously with polymerization. Purification of the monomer to polymerization grade is achieved by known purification techniques, including distillation.

The process of the present invention is applicable to the production of polymers of C-alkyl-substituted pyrrolidone, such as 4-methyl-2-pyrrolidone and copolymers of 2-pyrrolidone, such as with caprolactam, as well as to the production of poly-2-pyrrolidone. Consequently, in general, and unless otherwise indicated, "monomer" denotes 2-pyrrolidone, substituted 2-pyrrolidone, and any compound capable of copolymerizing with 2-pyrrolidone under the state conditions of alkaline polymerization catalysis.

Preferably, the catalyst system comprises about 0.5–30 mol percent or more of the 2-pyrrolidone-catalyst mixture, based on total 2-pyrrolidone, more preferably about 5–20 mol percent, and most preferably about 10 mol percent catalyst. Total 2-pyrrolidone consists of 2-pyrrolidonate catalyst, including alkali metal pyrrolidonate and quaternary ammonium pyrrolidonate, as well as carbonated alkali metal pyrrolidone and carbonated quaternary ammonium pyrrolidonate, and 2-pyrrolidone provided as solvent to said catalyst, and any additional monomer charged to the mixture for polymerization reaction. The polymerization ctalyst system is believed to principally comprise quaternary ammonium pyrrolidonate and carbonated quaternary ammonium pyrrolidonate, but substantial amounts of alkali metal pyrrolidonate and carbonated alkali metal pyrrolidonate (carboxypyrrolidonate) may also be present, depending upon the mol ratios chosen. Alkali metal halide is thought to be present, but it is believed to be inert towards the polymerization reaction.

In general, 2-pyrrolidone may be polymerized at a temperature from about 15° to about 100° C, preferably 25° to 70° C, and most preferably from about 40° C to about 60° C, under a pressure ranging from subatmospheric to superatmospheric, in the presence of the catalyst system for a period from about 4 to about 100 hours or longer, preferably for about 8 to about 72 hours, and most preferably from about 8 to about 48 hours. In continuous operation, polymerization time refers to average residence under polymerization conditions. A small amount of water, not exceeding about 0.1–0.2 weight percent, based on total 2-pyrrolidone, is permissible in the reaction mixture, but less than 0.1 weight percent is preferred.

Preparation of polymers of 2-pyrrolidone, according to the normal process of this invention, can be carried out with various amounts of monomers, catalyst, inert nonsolvent liquids, initiators and other additives — the amount of each being properly coordinated to produce the most effective polymerization — with or without stirred reactors, by bulk polymerization, solution polymerization, or otherwise, continuously or batchwise. Although the preferred conditions and amounts of the components in the reaction have been given, it is understood that these are not intended to be limitations to polymerization, since it may be possible to achieve substantial polymerization outside the preferred ranges.

EXEMPLIFICATION

EXAMPLE 1

100 g of 2-pyrrolidone (1.175 M) was mixed with 1.55 g of 85.5% KOH pellets (0.0236 M) to make a 2 mol percent potassium pyrrolidonate solution which was dehydrated by heating to incipient distillation at 2 mm pressure for 11 minutes. To the dehydrated solution was added sufficient carbon dioxide to make a polymerizate containing 30 mol % $CO_2$ based on potassium. The carbonated pyrrolidonate solution was poured into 2 bottles, one of which (a) was held at 50° C for 8 hours, the other (b) held at 50° C for 22 hours. After these time intervals the contents of the bottles were chopped, washed with water, dried, weighed and subjected to viscosity measurement for molecular weight determination as described. The results are presented in Table I. Examples 2–3 are performed substantially as Example 1.

EXAMPLE 4

Same as Example 1 except for the addition of 2.59 g (0.0236 M) of tetra methyl ammonium chloride after carbonation by weighing the dried onium salt in a dry box and adding same under $N_2$ at room temperature to the polymerizate with stirring for 5 minutes. The remaining procedure was as in Example 1. Examples 5–9 are performed substantially as Example 4.

EXAMPLES 10–12

A 3-liter flask equipped with stirrer, thermometer, and distillation head, was charged with 1000 ml of benzenes and 108 g (2 mols) of sodium methoxide. The mixture was heated to the boiling point and 100 ml of benzene was distilled overhead. Then, while maintaining distillation, 187.24 g (2.2 mols) of pyrrolidone was added over 38 minutes. Distillation was continued until no more methanol came over. During this time, 1200 ml of benzene was added, and the total overhead was 998 ml. After cooling to 21° C, 24.5 g of $CO_2$ was bubbled into the slurry for 40 minutes. The precipitate was removed by filtration, washed with benzene and then pentane, and finally dried under a nitrogen atmosphere to give 238.67 g of a white solid. Analysis showed this to be a 7:3 (molar) ratio of sodium pyrrolidonate and a $CO_2$-sodium pyrrolidonate mixture. Three flasks were charged with 24.26 (0.285 mols) of 2-pyrrolidone and 1.8 g (0.015 mols) of the above described solid. The resulting mixture was heated at 100° C for 10 minutes to dissolve the solid. It was then cooled to room temperature before adding 1.64 g of tetramethyl ammonium chloride to the flask of Example 11; and 2.48 g of tetraethyl ammonium chloride to the flask of Example 12. Nothing was added to the flask of Example 10. The contents of the flasks were polymerized at 50° C for 22 hours. The results are given in Table III.

EXAMPLE 13

100 g (1.175 M) of 2-pyrrolidone was mixed with 3.85 g of 85.5% KOH pellets (0.0588 M) to form a 5 mol percent potassium pyrrolidonate solution which was dehydrated by heating to incipient distillation at 2 mm pressure for 10 minutes. To the dehydrated solution was added 30 mol % carbon dioxide based on potassium. Then 0.12 g of acetic anhydride (0.1 mol percent based on total monomer) was added dropwise to the stirred polymerizate which was then polymerized for 8 hours at 50° C. The product was chopped, washed, dried, weighed and subjected to molecular weight determination. The results are given in Table IV.

EXAMPLE 14

Same as Example 13 but 6.44 g (0.0588 M) of tetramethyl ammonium chloride was added after carbonation to make a 5 mol % solution based on total monomer. Then 0.12 g of acetic anhydride was added. The remaining procedure was as in Example 13.

The polymerization process of this invention produces a high molecular weight poly-2-pyrrolidone at a high rate of conversion without producing the unpleasant odors which are sometimes associated with the dehydration of quaternary ammonium hydroxide-2-pyrrolidone mixtures. The combination of carbon dioxide polymerization activation and quaternary ammonium halide as a source of polymerization catalyst produces extremely high molecular weight polypyrrolidone. The addition of about one mol percent acetic anhydride has the additional effect of greatly accelerating the rate of polymerization.

Table I shows several polymerizations in the presence of potassium pyrrolidonate and carbon dioxide (Py-K/$CO_2$) with and without tetramethyl ammonium chloride. The tetramethyl or tetraethyl ammonium chloride in combination with carbon dioxide and potassium pyrrolidonate are found to be capable of producing polypyrrolidone of an extremely high weight average molecular weight in excess of one million. All molecular weights are reported as the weight average molecular weight determined from the specific viscosity of 0.1 g of polymer/100 cc of m-cresol solution at 25° C. All reported percentages are mol percent unless otherwise indicated.

TABLE I

| 8 hours[1] | % Py-K/$CO_2$[2] | %$(CH_3)_4NCl$ | %Conversion | Mw × $10^{-3}$ |
|---|---|---|---|---|
| Example 1a | 2 | 0 | 8.5 | 117 |
| Example 2a | 5 | 0 | 16.3 | 285 |
| Example 3a | 10 | 0 | 14.4 | 305 |
| Example 4a | 2 | 2 | 15.0 | 210. |
| Example 5a | 5 | 5 | 40.0 | 575 |
| Example 6a | 10 | 10 | 53.9 | 980 |
| 22 hours[1] | | | | |
| Example 1b | 2 | 0 | 20.1 | 220 |
| Example 2b | 5 | 0 | 45.2 | 380 |
| Example 3b | 10 | 0 | 48.3 | 500 |
| Example 4b | 2 | 2 | 37.7 | 330 |
| Example 5b | 5 | 5 | 69.1 | 1050 |
| Example 6b | 10 | 10 | 59.4 | 820 |

[1]50° C
[2]30 mol % $CO_2$ based on K.

TABLE II[1]

| | %$(CH_3)_4$NCl | Mol Ratio $(CH_3)_4$NCl/K | %Conversion | Mw × $10^{-3}$ |
|---|---|---|---|---|
| Example 2b | 0 | — | 45.2 | 380 |
| Example 7 | 1.5 | 0.3 | 62.9 | 555 |
| Example 8 | 3 | 0.6 | 68.7 | 635 |
| Example 5b | 5 | 1.0 | 69.1 | 1050 |
| Example 9 | 7.7 | 1.5 | 69.2 | 605 |

[1]22 hours, 50° C, 5 mol % Py-K/$CO_2$ (30 mol% $CO_2$ based on K)

TABLE III

| | Carbonated Pyrrolidonate, 5% | Ammonium Halide, 5% | %Conversion | Mw × $10^{-3}$ |
|---|---|---|---|---|
| Example 2b | Py-K/$CO_2$[1] | 0 | 45.2 | 380 |
| Example 5b | " | $(CH_3)_4$NCl | 69.1 | 1050 |
| Example 10 | Py-Na/$CO_2$[2] | 0 | 34.8 | 295 |
| Example 11 | " | $(CH_3)_4$ NCl | 48.5 | 380 |

TABLE III-continued

| | Carbonated Pyrrolidonate, 5% | Ammonium Halide, 5% | %Conversion | Mw × 10⁻³ |
|---|---|---|---|---|
| Example 12 | " | $(C_2H_5)_4$NCl | 67.4 | 385 |

[1]From KOH, 50° C, 22 hours, 30 mol % $CO_2$ based on K
[2]From Na-alkoxide, 50° C, 22 hours, 30 mol % $CO_2$ based on Na

TABLE IV

| | %$(CH_3C_4$NCl | %$AC_2O$[1] | % Conversion[2] |
|---|---|---|---|
| Example 2a | 0 | 0 | 16 |
| Example 13 | 0 | 0.1 | 47 |
| Example 5a | 5 | 0 | 40 |
| Example 14 | 5 | 0.1 | 76 |

[1]Acetic anhydride, mol%
[2]8 hours at 50° C, 5 mol% Py-K/$CO_2$ (30 mol % $CO_2$ based on K)

The examples of Table I show the remarkably high weight average molecular weights obtainable from the catalyst system of the present invention with good conversions of monomer to poly-2-pyrrolidone is remarkably short times for these molecular weights in this reaction. Percent conversion is calculated at 100x (weight of polymer)/(weight of total 2-pyrrolidone) and total 2-pyrrolidone has been defined heretofore.

The examples of Table II show the effect of mol ratio of alkali metal, e.g., potassium hydroxide, to tetralkyl ammonium halide. The highest molecular weights are believed to be achieved to about equimolar amounts (equivalent amounts) of the alkali metal pyrrolidonate and the tetraalkyl ammonium halide.

Table III shows the effect of an anhydrous source of alkali metal vs. a water-forming source, i.e., alkali metal hydroxide which reacts with 2-pyrrolidone to produce water, with and without 5 mol percent of the specified halide. In general, the hydroxide is a very satisfactory source of alkali metal for this catalyst system.

Table IV shows the remarkable effect produced on the rate of polymerization by the addition of a small amount of acetic anhydride to this catalyst system. 76% conversion is achievable after only 8 hours at 50° C, giving a product having a molecular weight of 175,000.

TABLE V

| | %$AC_2O$[1] | %$(CH_3)_4$NCl | %Conversion[4] | Mw × 10⁻³ |
|---|---|---|---|---|
| Ex. 15[2] | 0 | 0 | 4.1 | 35 |
| Ex. 16[3] | 0 | 5 | 35.4 | 165 |
| Ex. 17[3] | 0.6 | 5 | 48.2 | 150 |
| Ex. 18[3] | 1.11 | 5 | 75.7 | 56 |

[1]Mol percent acetic anhydride
[2]10 mol percent KOH (K-pyrrolidonate), no $CO_2$
[3]5 mol percent KOH (K-pyrrolidonate), no $CO_2$
[4]22 hours, 50° C Table V shows the effect of omitting $CO_2$ from the catalyst system. Molecular weights are found to be lowered. While the addition of acetic anhydride gives high conversion at 22 hours the average molecular weight in the absence of carbon dioxide is still lowered.

TABLE VI

| Ammonium Salt[1] | %Conversion[2] | Mw × 10⁻³ |
|---|---|---|
| — | 32.9 | 390 |
| $(CH_3)_4$NCl | 69.1 | 1050 |
| $(CH_3)_4$NBr | 35.0 | 420 |
| $(CH_3)_4$NI | 33 | 380 |
| $(C_2H_5)_4$NCl | 73.2 | 1025 |
| $(C_2H_5)_4$NBr | 51.6 | 610 |
| $(C_2H_5)_4$NI | 33 | 390 |
| $(C_2H_5)_3(OCH_2)$NCl | 63.9 | 880 |
| $(C_2H_5)_3(OCH_2)$NBr | 49.1 | 510 |
| $(C_4H_9)_4$NI | 23.9 | 410 |
| $(CH_3)_3(CH_2CH_2OH)$NCl | 17.9 | 95 |
| $(CH_3)_3$HNCl | 0 | — |
| $H_4$NCl | 0 | — |

[1]In mol ratio ammonium salt/K = 1–0.77, 5 mol% KOH (K-pyrrolidonate), 1.5 mol % $CO_2$, based on total 2-pyrrolidone.
[2]22 hours at 50° C Table VI shows the results obtained with a variety of ammonium halides used in combination with potassium pyrrolidonate and carbon dioxide to form the catalyst of the present invention. The results include remarkably high molecular weights for poly-2-pyrrolidone.

What is claimed is:

1. A process for polymerizing 2-pyrrolidone to form a polymer suitable for forming fibers in a polymerization reaction zone which comprises contacting the 2-pyrrolidone with a catalyst comprising potassium pyrrolidonate, tetra alkyl ammonium halide and carbon dioxide in a mol ratio of 1:0.1–2:0.1–0.5 and wherein the water content in the reaction zone does not exceed about 0.1–0.2 weight percent based on total 2-pyrrolidone feed.

2. A process in accordance with claim 1 wherein the tetraalkyl ammonium halide is tetra $C_1$–$C_6$ alkyl ammonium halide.

3. A process in accordance with claim 1 wherein the tetraalkyl ammonium halide is tetramethyl, tetraethyl or tetrapropyl ammonium chloride or bromide.

4. A process in accordance with claim 1 wherein the alkyl metal pyrrolidonate is potassium pyrrolidonate.

5. A process in accordance with claim 1 wherein said mol ratio is about 1:0.2–1.5:0.1–0.5.

6. A process in accordance with claim 1 wherein the alkali metal pyrrolidonate is prepared by steps comprising contacting an alkali metal hydroxide with 2-pyrrolidone.

7. A process in accordance with claim 1 wherein the tetraalkyl ammonium halide is tetramethyl ammonium halide.

8. A process in accordance with claim 1 wherein the catalyst also comprises 0.05–1.0 mol percent of a polymerization activator selected from the group consisting of N-acyl pyrrolidone, N-acyl caprolactum, acetic anhydride, and 1-(1-pyrrolin-2-yl)-2-pyrrolidone.

9. A process in accordance with claim 8 wherein the N-acyl pyrrolidone is N-acetyl pyrrolidone.

* * * * *